(12) United States Patent
Takano

(10) Patent No.: US 9,927,734 B2
(45) Date of Patent: Mar. 27, 2018

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Yusuke Takano, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/318,809

(22) PCT Filed: May 11, 2015

(86) PCT No.: PCT/JP2015/063443
§ 371 (c)(1),
(2) Date: Dec. 14, 2016

(87) PCT Pub. No.: WO2015/194283
PCT Pub. Date: Dec. 23, 2015

(65) Prior Publication Data
US 2017/0123339 A1    May 4, 2017

(30) Foreign Application Priority Data
Jun. 20, 2014  (JP) ................................ 2014-127098

(51) Int. Cl.
*G03G 15/043* (2006.01)
*G03G 15/04* (2006.01)
(52) U.S. Cl.
CPC ..... *G03G 15/043* (2013.01); *G03G 15/04072* (2013.01)

(58) Field of Classification Search
CPC ....... G03G 15/04036; G03G 15/04072; G03G 15/043; G03G 15/0435
See application file for complete search history.

(56) References Cited

U.S. PATENT DOCUMENTS

2006/0098994 A1* 5/2006 Tamaru .................. G02B 26/12
399/17
2010/0060963 A1* 3/2010 Miyake ................ G02B 26/127
359/197.1

FOREIGN PATENT DOCUMENTS

| JP | 6-148543 | 5/1994 |
| JP | 8-21971 | 1/1996 |

(Continued)

OTHER PUBLICATIONS

Machine translation of JP 2002-182138. Dated Jun. 26, 2002.*
International Search Report dated Jul. 28, 2015 in corresponding International Application No. PCT/JP2015/063443.

*Primary Examiner* — Carla Therrien
(74) *Attorney, Agent, or Firm* — Wenderoth, Lind & Ponack, L.L.P.

(57) ABSTRACT

An optical scanning device includes a housing (80) for receiving a scanning optical system (72), a cover (90) for closing an opening of a receiving area (80A), and a detection member (78) arranged outside of the receiving area (80A). A first portion (83), which is a portion of the housing sidewall part (82), is formed with a light detection opening (83A) through which a light beam is emitted from the inside to the outside of the receiving area (80A) and is received in the detection member (78), and the light detection opening (83A) is closed by a light transmitting member (8) through which the light beam passes.

7 Claims, 7 Drawing Sheets

(56) References Cited

FOREIGN PATENT DOCUMENTS

| | | |
|---|---|---|
| JP | 2002-148548 | 5/2002 |
| JP | 2002-182138 | 6/2002 |
| JP | 2005-91933 | 4/2005 |
| JP | 2014-81536 | 5/2014 |

* cited by examiner

OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

An optical scanning device (an exposure device) mounted in an electrophotographic image forming apparatus includes a light source for emitting a light beam, a scanning optical system for deflecting and scanning a surface to be scanned by the light beam from the light source, and the like. Furthermore, each member constituting the optical scanning device, such as the light source and the scanning optical system, is held to a casing of the optical scanning device. In addition, the scanning optical system is received in a receiving area provided in the casing in order to suppress dust such as scattered toner from being attached to the scanning optical system.

Furthermore, in the optical scanning device, a detection member for detecting the light beam emitted from the light source is installed (for example, see Patent Literature 1). The detection member includes a light receiving element such as a photodiode, receives and detects the light beam, and outputs a detection signal indicating that the light beam have been detected. Furthermore, a control unit for controlling an operation of the optical scanning device measures a start timing of optical scanning on the basis of the detection signal from the detection member.

CITATION LIST

Patent Literature

Patent Literature 1: Japanese Laid-open Patent Publication No. 2002-148548

SUMMARY OF INVENTION

Technical Problem

For example, the scanning optical system includes a polygon mirror, but should transmit driving force of a motor to the polygon mirror in order to rotate the polygon mirror. Therefore, in the casing, the motor is also received in addition to the scanning optical system. As described above, when the motor is also received in the casing, a temperature in the casing is increased due to heat generated in the motor.

Herein, when a thermal damage to the detection member is caused, the sensitivity of the light receiving element of the detection member may be reduced. When the sensitivity of the light receiving element is reduced, the detection accuracy of a light beam is lowered, so that the start timing of the optical scanning is shifted from a target timing. Consequently, in order to suppress the thermal damage to the detection member from being caused, there is a case in which the detection member is arranged outside of the casing rather than inside thereof. When the detection member is arranged outside of the casing, even though a temperature in the casing is increased, since the thermal damage to the detection member is difficult to be caused, the reduction of the sensitivity of the light receiving element is suppressed.

When the detection member is arranged outside of the casing, an opening for emitting a light beam from the inside to the outside of the casing is formed in a part of the casing in order to allow the light beam to be received in the detection member. However, when such an opening is formed in the casing, dust enters into the casing via the opening and the scanning optical system in the casing is contaminated. That is, a dustproof property is reduced.

Accordingly, the present invention is made to solve the above mentioned problems and an object of the present invention is to provide an optical scanning device capable of suppressing a dustproof property from being reduced while suppressing a thermal damage to a detection member for detecting a light beam from being caused, and an image forming apparatus including the same.

Solution to Problem

In order to achieve the aforementioned object, an optical scanning device of the present invention includes a scanning optical system, a housing, a cover, and a detection member. The scanning optical system deflects and scans a surface to be scanned by a light beam emitted from a light source. The housing has a bottom part and a housing sidewall part upright from the bottom part in a vertical direction. The housing receives the scanning optical system in a receiving area surrounded by the bottom part and the housing sidewall part. The cover is mounted on the housing from an upper side of the housing to close an opening of the receiving area. The detection member is arranged outside of the receiving area to receive and detect a light beam and outputs a detection signal for measuring a start timing of optical scanning to the surface to be scanned. Furthermore, a first portion, which is a portion of the housing sidewall part, is formed with a light detection opening through which the light beam is emitted from an inside to an outside of the receiving area and is received in the detection member. The light detection opening is closed by a light transmitting member through which the light beam passes.

In the configuration of the present invention, as described above, since the detection member for detecting a light beam is arranged outside of the receiving area, even though a temperature in the receiving area is increased, it is possible to suppress a thermal damage to the detection member from being caused. Furthermore, in order to allow the light beam to be received in the detection member arranged outside of the receiving area, the light detection opening for emitting the light beam from the inside to the outside of the receiving area is formed in a portion (the first portion) of the housing sidewall part; however, since the light detection opening is closed by the light transmitting member, the flow of dust entering into the receiving area via the light detection opening is blocked by the light transmitting member. In this way, even when the detection member is arranged outside of the receiving area and accordingly the light detection opening is formed in the first portion, it is possible to suppress a dustproof property from being reduced.

Advantageous Effects of Invention

As described above, according to the present invention, it is possible to suppress a dustproof property from being reduced while suppressing a thermal damage to a detection member for detecting a light beam from being caused.

DESCRIPTION OF EMBODIMENTS

An optical scanning device according to an embodiment of the present invention and an image forming apparatus including the same will be described employing a multifunctional peripheral as an example.

<Entire Configuration of Multifunctional Peripheral>

Figure 1:
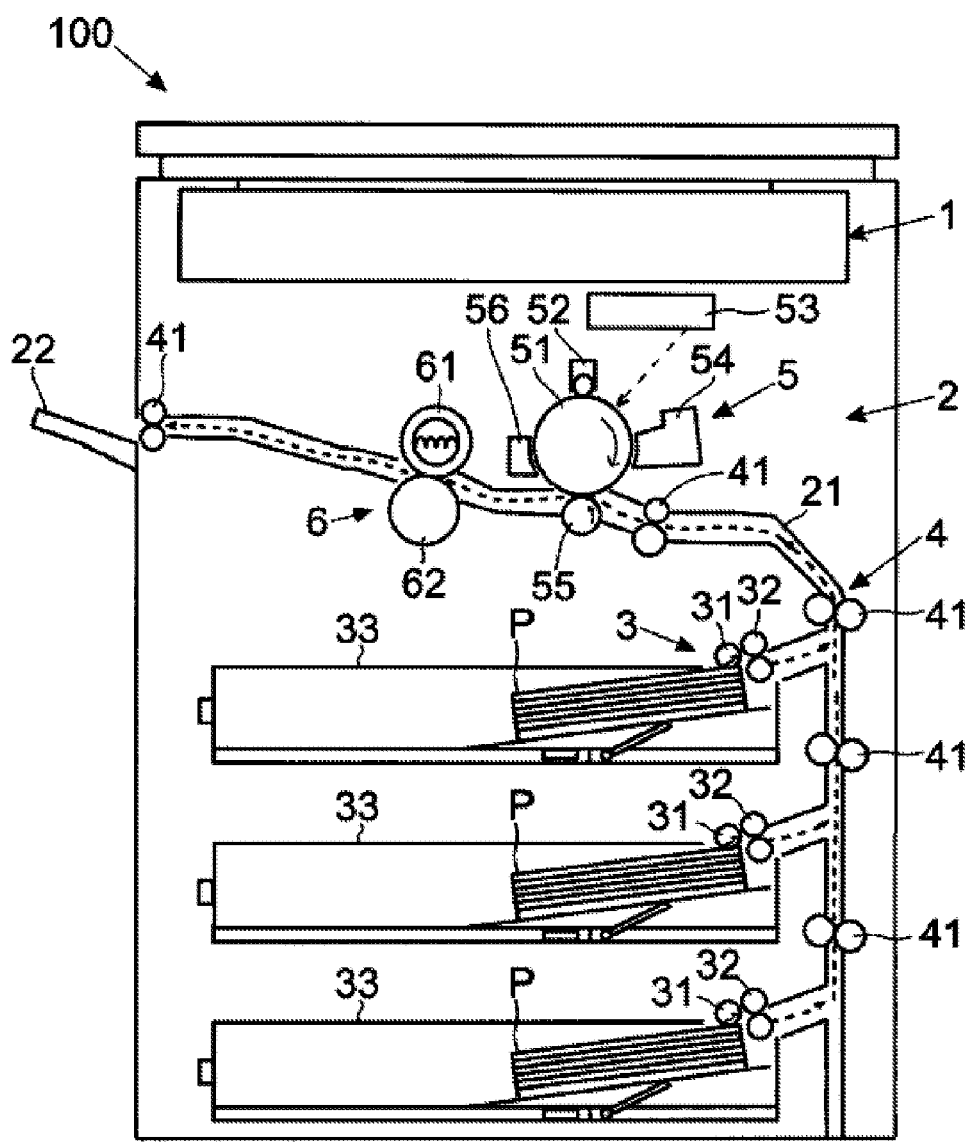
FIG. 1 is a schematic diagram of a multifunctional peripheral (an image forming apparatus) mounted with an exposure device (an optical scanning device) according to an embodiment of the present invention.

As illustrated in FIG. 1, a multifunctional peripheral 100 (corresponding to an "image forming apparatus") includes an image reading unit 1 and a print unit 2. The image reading unit 1 reads a document and generates image data. The print unit 2 conveys a paper P along a paper conveyance path 21 and forms a toner image on the basis of the image data. Furthermore, the print unit 2 prints the toner image on the paper P being conveyed, and discharges the printed paper P to a discharge tray 22.

The print unit 2 is configured with a paper feeding section 3, a paper conveyance section 4, an image forming section 5, and a fixing section 6. The paper feeding section 3 includes a pick-up roller 31 and a paper feeding roller pair 32, and supplies the paper P received in a paper cassette 33 to the paper conveyance path 21. The paper conveyance section 4 includes a plurality of conveying roller pairs 41 and conveys the paper P along the paper conveyance path 21.

The image forming section 5 includes a photosensitive drum 51, a charging device 52, an exposure device 53 (corresponding to an "optical scanning device"), a development device 54, a transfer roller 55, and a cleaning device 56.

At the time of image formation, the photosensitive drum 51 rotates and the surface (corresponding to a "surface to be scanned") of the photosensitive drum 51 is charged by the charging device 52. Furthermore, the exposure device 53 exposes the surface of the photosensitive drum 51 and forms an electrostatic latent image on the surface of the photosensitive drum 51. The development device 54 supplies toner to the electrostatic latent image formed on the surface of the photosensitive drum 51, and develops the electrostatic latent image.

The transfer roller 55 is brought into press-contact with the surface of the photosensitive drum 51 and forms a transfer nip between the photosensitive drum 51 and the transfer roller 55. The paper P enters into the transfer nip, so that a toner image on the surface of the photosensitive drum 51 is transferred to the paper P. The cleaning device 56 removes toner and the like remaining on the surface of the photosensitive drum 51.

The fixing section 6 includes a heating roller 61 and a pressure roller 62. The heating roller 61 has a heating source therein. The pressure roller 62 is brought into press-contact with the heating roller 61 and forms a fixing nip between the heating roller 61 and the pressure roller 62. Furthermore, the paper P with the transferred toner image passes through the fixing nip, so that the paper P is heated and pressed. In this way, the toner image is fixed to the paper P and the print is completed.

<Configuration of Exposure Device>

Figure 2:
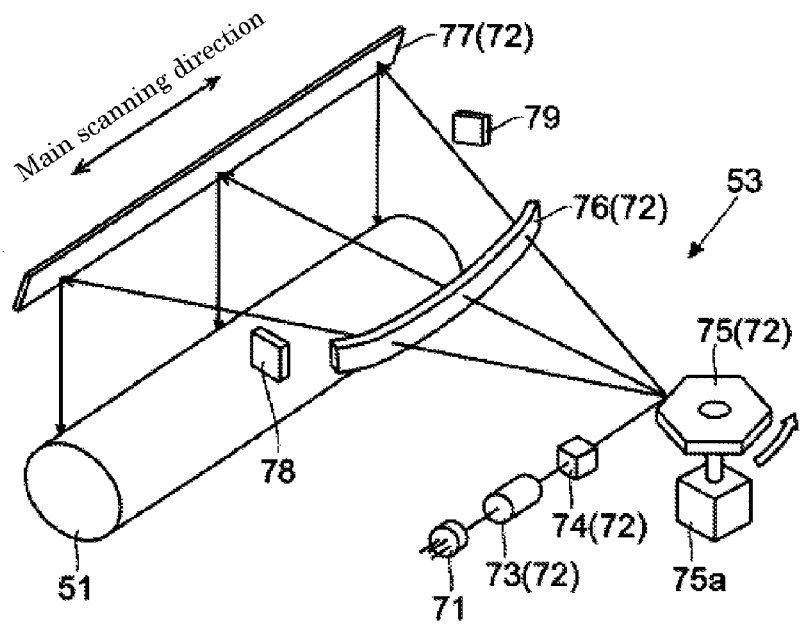
FIG. 2 is a schematic diagram for explaining an internal configuration of an exposure device according to an embodiment of the present invention.

As illustrated in FIG. 2, the exposure device 53 includes a semiconductor laser element 71 (corresponding to a "light source") and a scanning optical system 72. The semiconductor laser element 71 emits a light beam for exposure. The scanning optical system 72 includes a collimator lens 73, a cylindrical lens 74, a polygon mirror 75, a Fθlens 76, a reflection mirror 77 and the like, and deflects and scans the surface of the photosensitive drum 51 by the light beam emitted from the semiconductor laser element 71.

The collimator lens 73 converts the light beam emitted from the semiconductor laser element 71 into parallel light. The cylindrical lens 74 has predetermined refractive power only in a sub-scanning direction perpendicular to a main scanning direction, and forms an image of the light beam from the collimator lens 73 on a reflection surface of the polygon mirror 75. The polygon mirror 75 is a rotating polygon mirror having a plurality of reflection surfaces and is rotated by driving force transmitted from a polygon motor 75a. Furthermore, the polygon mirror 75 rotates, thereby deflecting and scanning the light beam incident into its reflection surface. The Fθlens 76 scans the light beam from the polygon mirror 75 at a predetermined speed in the main scanning direction so as to be led to the reflection mirror 77.

The reflection mirror 77 reflects the light beam toward the surface of the photosensitive drum 51, which is a surface to be scanned.

Furthermore, the exposure device 53 is provided with a detection member 78 for detecting the light beam and outputting a detection signal, and a reflection mirror 79 for reflecting the light beam toward the detection member 78. The detection member 78 is a board mounted with a light receiving element 78a (see FIG. 12) such as a photodiode, and receives the light beam to change an output value of the detection signal. The detection signal outputted from the detection member 78 is received by a control unit (not illustrated) of the multifunctional peripheral 100. Furthermore, on the basis of the detection signal from the detection member 78, the control unit of the multifunctional peripheral 100 measures an exposure start timing (an optical scanning start timing) for the surface of the photosensitive drum 81.

Figure 3:
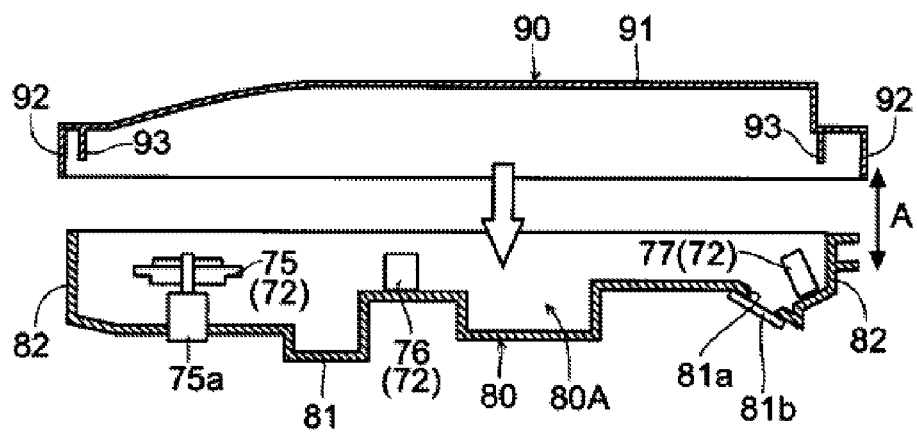
FIG. 3 is a sectional view (a view illustrating a state before a cover is mounted in a housing) for explaining a configuration of a casing of an exposure device according to an embodiment of the present invention.
Figure 4:
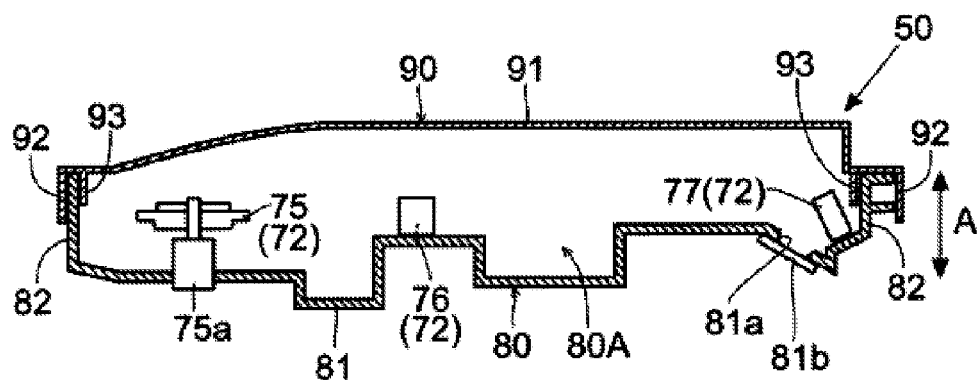
FIG. 4 is a sectional view (a view illustrating a state after a cover is mounted in a housing) for explaining a configuration of a casing of an exposure device according to an embodiment of the present invention.

In order to hold the semiconductor laser element 71 and the scanning optical system 72, the exposure device 53 includes a casing 50 as illustrated in FIG. 3 and FIG. 4. This casing 50 is configured with a housing 80 and a cover 90. Hereinafter, a vertical direction of the exposure device 53 will be referred to as a direction A for description.

The housing 80 has a bottom part 81 and sidewall parts 82 (hereinafter, referred to as housing sidewall parts 82) upright in the direction A (upward) from the bottom part 81. Furthermore, the housing 80 receives the scanning optical system 72 in a receiving area 80A which is an area surrounded by the bottom part 81 and the housing sidewall parts 82. Although not illustrated in the drawings, the semiconductor laser element 71 is not received inside of the receiving area 80A and is arranged outside of the receiving area 80A. Therefore, a light beam emitted from the semiconductor laser element 71 enters into the receiving area 80A via a light incident hole (not illustrated) formed in the housing 80.

The scanning optical system 72 received in the receiving area 80A is mounted in the bottom part 81, but a stepped portion is formed in the bottom part 81. The reason for forming the stepped portion in the bottom part 81 as described above is for aligning the positions in the direction A of members constituting the scanning optical system 72. Furthermore, the bottom part 81 is formed with a light emitting hole 81a through which a light beam (a light beam reflected by the reflection mirror 77) is emitted from the inside to the outside of the exposure device 53 such that the surface of the photosensitive drum 51 is irradiated with the light beam. The light emitting hole 81a is a hole opened in an approximately rectangular shape and employing the main scanning direction as a longitudinal direction, and is closed by a transparent window 81b from the outside.

The cover 90 has a top surface part 91 and sidewall parts 92 (hereinafter, referred to as cover sidewall parts 92) upright in the direction A (downward) from the top surface part 91. In addition, the top surface part 91 needs not to be flat and an inclination or a stepped portion may also be formed in a part thereof. For example, in an example illustrated in FIG. 3 and FIG. 4, a portion (an end portion facing the reflection mirror 77 side) of the top surface part 91 is concave downward, but the concave portion is also a portion of the top surface part 91.

Furthermore, at an inner side portion of the top surface part 91 from the cover sidewall part 92, ribs 93 are integrally formed. The rib 93 is upright in a wall shape in the direction A (downward) and faces the cover sidewall part 92 while being spaced apart from the cover sidewall part 92. In addition, the cover sidewall part 92 is formed across the entire circumference of the top surface part 91, but the rib 93 is also formed across the entire circumference of the top surface part 91 in a similar manner.

The cover 90 is mounted on the housing 80 from an upper side (an opening side of the receiving area 80A) of the housing 80. In this way, the receiving area 80A is closed by the cover 90 (the top surface part 91 covers the receiving area 80A). Furthermore, in the state in which the cover 90 has been mounted on the housing 80, the cover sidewall part 92 arranged outside of the housing sidewall part 82 and the housing sidewall part 82 is interposed by the cover sidewall part 92 and the rib 93. As described above, when the housing sidewall part 82 is interposed by the cover sidewall part 92 and the rib 93, the entrance of dust (scattered toner and the like) into the receiving area 80A is suppressed. That is, it is possible to suppress the scanning optical system 72 from being contaminated.

Figure 5:
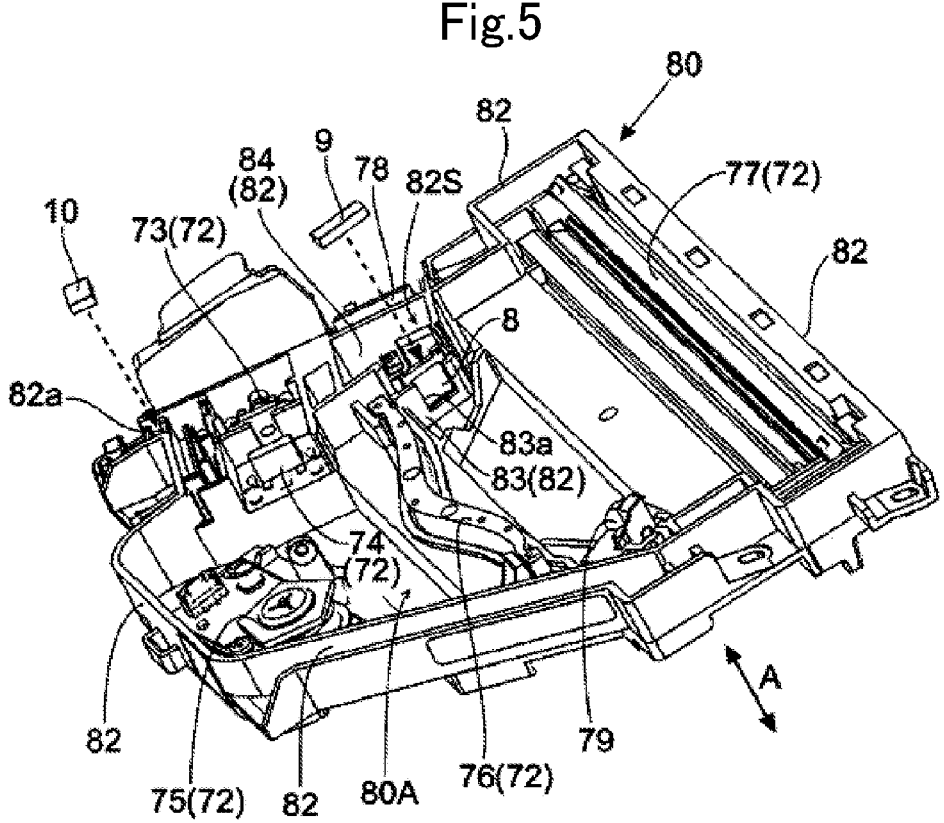
FIG. 5 is a perspective view for explaining a configuration of a housing constituting a casing of an exposure device according to an embodiment of the present invention.
Figure 6:
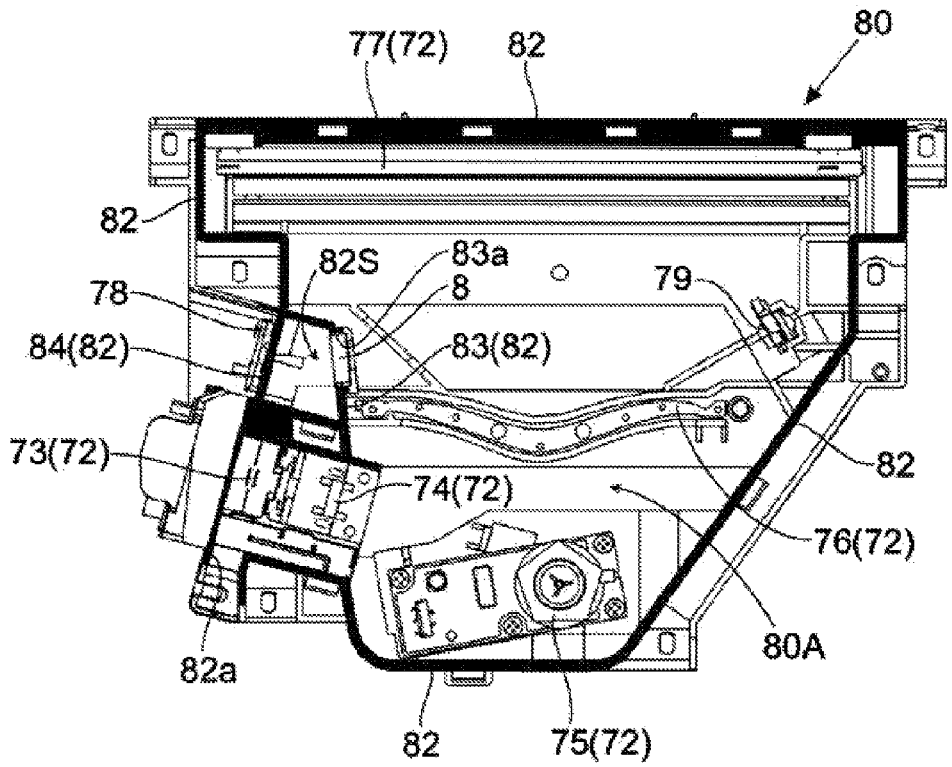
FIG. 6 is a plan view for explaining a configuration of a housing constituting a casing of an exposure device according to an embodiment of the present invention.

As illustrated in FIG. 5 and FIG. 6, the detection member 78 is held to the housing 80, but is not received inside of the receiving area 80A and is arranged outside of the receiving area 80A. Therefore, a first portion 83, which is a part of the housing sidewall part 82, is formed with a light detection opening 83a through which a light beam is emitted from the inside to the outside of the receiving area 80A and is received in the detection member 78 (the light receiving element 78a). In this way, even though the detection member 78 is arranged outside of the receiving area 80A, it is possible to allow a light beam to be received in the detection member 78. In addition, the reflection mirror 79 is received in the receiving area 80A and a light beam reflected by the reflection mirror 79 reaches the detection member 78 via the light detection opening 83a.

As described above, in the case in which the detection member 78 has been arranged outside of the receiving area 80A and thus the light detection opening 83a has been formed in the first portion 83, when the light detection opening 83a is kept in an opened state, since dust enters into the receiving area 80A from the light detection opening 83a, the scanning optical system 72 is contaminated. In this regard, the first portion 83 is mounted with a light transmitting member 8 that closes the light detection opening 83a. For example, the light transmitting member 8 is a lens for converging a light beam to the detection member 78. However, the light transmitting member 8 does not need to have a lens function, and a transparent plate having no lens function may also be used as the light transmitting member 8.

Figure 7:
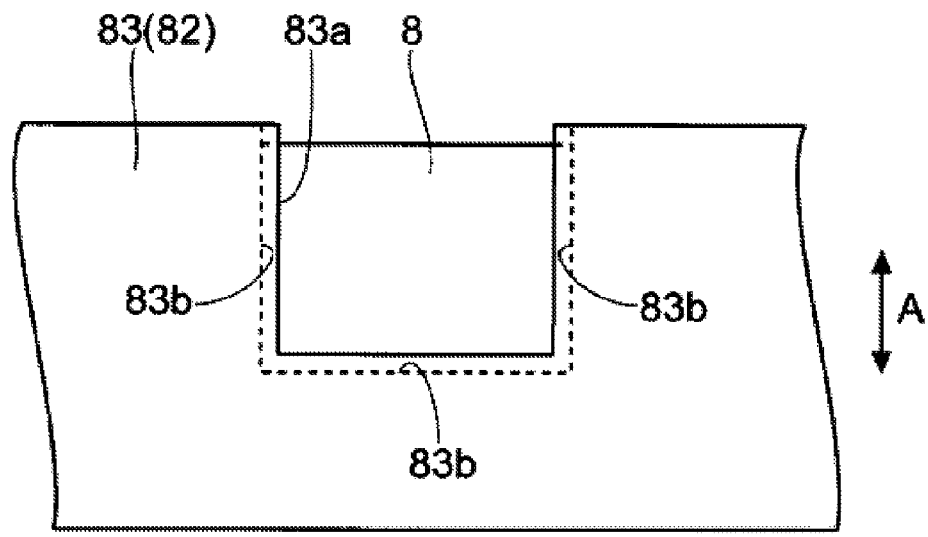
FIG. 7 is an enlarged view when a light detection opening formed in a casing of an exposure device according to an embodiment of the present invention and a light transmitting member fitted into the light detection opening are viewed from side.
Figure 8:
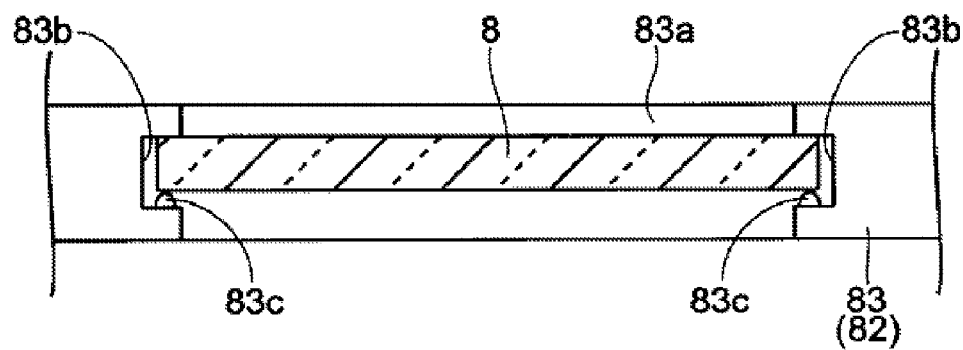
FIG. 8 is an enlarged view when a light detection opening formed in a casing of an exposure device according to an embodiment of the present invention and a light transmitting member fitted into the light detection opening are viewed from above.

As illustrated in FIG. 7 and FIG. 8, an opening shape of the light detection opening 83a is a notch shape cut from an upper side of the first portion 83. Furthermore, each surface constituting an inner edge of the light detection opening 83a is formed with a slit 83b along the inner edge of the light detection opening 83a. Moreover, the slit 83b is formed at an inner surface of one side thereof with a protrusion 83c that protrudes toward an inner surface of the other side thereof. Furthermore, the light transmitting member 8 is press-fitted into the slit 83b from an upper side of the first portion 83, so that the light transmitting member 8 is fitted into the light detection opening 83a. In this way, the light detection opening 83a is closed by the light transmitting member 8. In addition, in the state in which the light transmitting member 8 has been fitted into the light detection opening 83a, the protrusion 83c exists on the inner surface of one side of the slit 83b, so that the light transmitting member 8 adheres to the inner surface of the other side of the slit 83b.

Figure 9:
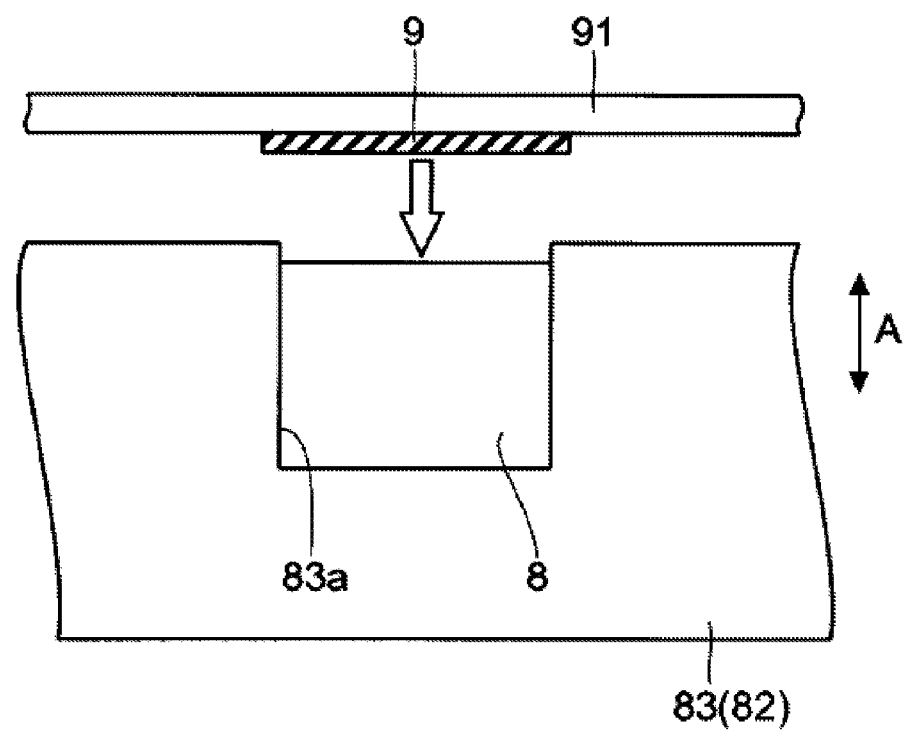
FIG. 9 is an enlarged view when a light detection opening formed in a casing of an exposure device according to an embodiment of the present invention and a light transmitting member fitted into the light detection opening are viewed from side (a view illustrating a state before a cover is mounted).
Figure 10:
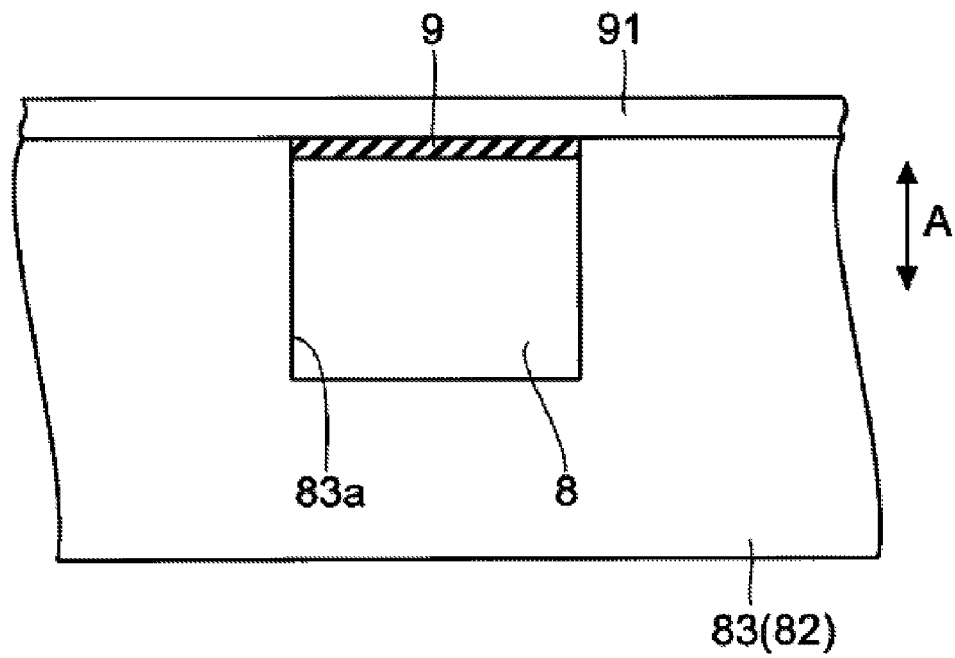
FIG. 10 is an enlarged view when a light detection opening formed in a casing of an exposure device according to an embodiment of the present invention and a light transmitting member fitted into the light detection opening are viewed from side (a view illustrating a state after a cover is mounted).

Furthermore, as illustrated in FIG. 9 and FIG. 10, at a portion of the top surface part 91, which overlaps a formation position of the light detection opening 83a, an elastic member 9 including an elastic material such as a sponge is arranged. Therefore, when the cover 90 is mounted on the housing 80, the elastic member 9 is interposed between the light transmitting member 8 and the top surface part 91. That is, the elastic member 9 is inserted into a gap occurring at an upper end side of the light transmitting member 8. In this way, the light detection opening 83a is closed without a gap, so that the entrance of dust into the receiving area 80A from the light detection opening 83a is suppressed.

Figure 11:
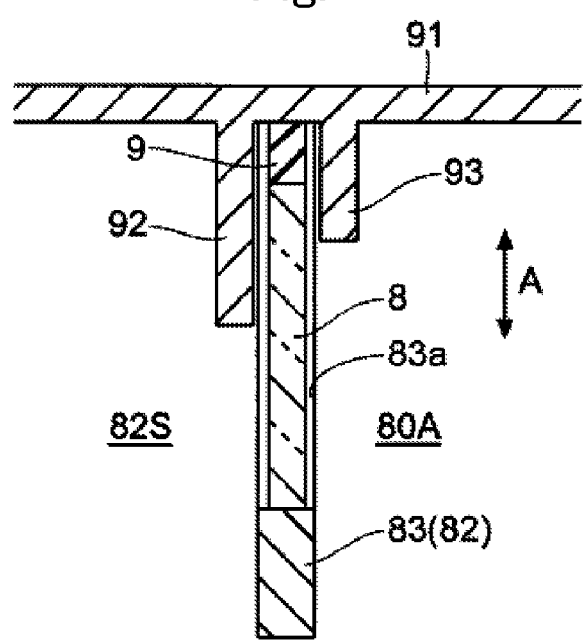
FIG. 11 is a sectional view illustrating a light detection opening formed in a casing of an exposure device according to an embodiment of the present invention and a light transmitting member fitted into the light detection opening (a view illustrating a state after a cover is mounted).

In addition, as illustrated in FIG. 11, the cover sidewall part 92 and the rib 93 also exist in the formation position of the light detection opening 83a. Furthermore, at the formation position of the light detection opening 83a, the light transmitting member 8 (also including the elastic member 9) fitted into the light detection opening 83a is interposed by the cover sidewall part 92 and the rib 93.

Moreover, as illustrated in FIG. 5 and FIG. 6, the housing sidewall part 82 is formed with a cable outlet opening 82a for drawing a cable (not illustrated) connected to the polygon motor 75a. Therefore, also at a portion of the top surface part 91, which overlaps a formation position of the cable outlet opening 82a, an elastic member 10 similar to the elastic member 9 is arranged. By the elastic member 10, the cable outlet opening 82a is also configured to be closed.

Furthermore, in order to further suppress the entrance of dust into the receiving area 80A from the light detection opening 83a, the housing sidewall part 82 integrally has a second portion 84. The second portion 84 is upright in a wall shape at an outer side of the first portion 83 in the direction A so as to face the first portion 83, and surrounds one area of the outer side of the first portion 83 together with the first portion 83. That is, the one area of the outer side of the first portion 83 is surrounded by the first portion 83 and the second portion 84, thereby serving as a space 82S separated from the receiving area 80A. When such a space 82S is provided, the entrance of dust into the one area of the outer side of the first portion 83 is suppressed, so that dust from an exterior of the exposure device 53 is difficult to reach the light detection opening 83a.

Figure 12:
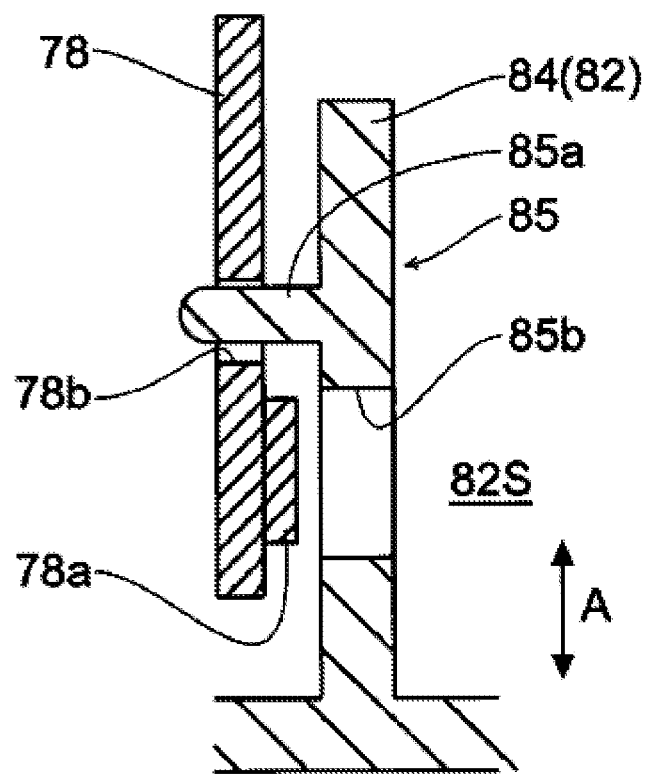
FIG. 12 is a sectional view illustrating a mounting structure of a detection member mounted in a casing of an exposure device according to an embodiment of the present invention.

The second portion 84 is a part for holding the detection member 78 in addition to a part for suppressing the entrance of dust. Therefore, as illustrated in FIG. 12, the second portion 84 is provided with a mounting portion 85 for mounting the detection member 78. The mounting portion 85 has a boss 85a and a light receiving hole 85b. Furthermore, a board of the detection member 78 is formed with a mounting hole 78b, and when the detection member 78 is mounted in the mounting portion 85, the boss 85a is inserted into the mounting hole 78b. Furthermore, in the state in which the detection member 78 has been mounted in the mounting portion 85, the light receiving element 78a and the light receiving hole 85b are superposed with each other. In this way, a light beam is incident into the light receiving element 78a via the light receiving hole 85b.

In addition, the light receiving element 78a, into which the boss 85a is inserted, is a long hole employing a horizontal direction (a vertical direction with respect to the paper surface of FIG. 12) perpendicular to the direction A as a longitudinal direction. Furthermore, the board of the detection member 78 is separated from the second portion 84 (does not adhere to the second portion 84). In this way, it is possible to move the detection member 78 in the horizontal direction, so that it is possible to adjust a holding position of the detection member 78 in the horizontal direction.

As described above, when the position adjustment of the detection member 78 has become possible, since there is a gap between the second portion 84 and the detection member 78, dust may enter into the space 82S via the light receiving hole 85b from the gap. However, even though dust enters into the space 82S, since the space 82S and the receiving area 80A are partitioned by the first portion 83 and the light detection opening 83a formed in the first portion 83 is closed by the light transmitting member 8 and the elastic member 9 as illustrated in FIG. 11, the entrance of dust into the receiving area 80A is small (there is almost no entrance of dust).

As described above, the exposure device 53 (an optical scanning device) of the present embodiment has the scanning optical system 72 for deflecting and scanning the surface (a surface to be scanned) of the photosensitive drum 51 by a light beam emitted from the semiconductor laser element 71 (a light source), the housing 80 having the bottom part 81 and the housing sidewall part 82 upright from the bottom part 81 in the direction A (a vertical direction) and receiving the scanning optical system 72 in the receiving area 80A surrounded by the bottom part 81 and the housing sidewall part 82, the cover 90 mounted on the housing 81 from an upper side of the housing 81 to close an opening of the receiving area 80A, and the detection member 78 arranged outside of the receiving area 80A to receive and detect a light beam and outputting a detection signal for measuring a start timing of optical scanning to the surface of the photosensitive drum 51. Furthermore, the first portion 83, which is a portion of the housing sidewall part 82, is formed with the light detection opening 83a through which a light beam is emitted from the inside to the outside of the receiving area 80A and is received in the detection member 78. Furthermore, the light detection opening 83a is closed by the light transmitting member 8 through which a light beam passes.

In the configuration of the present embodiment, since the detection member 78 for detecting a light beam is arranged outside of the receiving area 80A, even though a temperature in the receiving area 80A is increased, it is possible to suppress a thermal damage to the detection member 78 from being caused. Furthermore, in order to allow the light beam to be received in the detection member 78 arranged outside of the receiving area 80A, the light detection opening 83a for emitting the light beam from the inside to the outside of the receiving area 80A is formed in a portion (the first portion 83) of the housing sidewall part 82; however, since the light detection opening 83a is closed by the light transmitting member 8, the flow of dust entering into the receiving area 80A via the light detection opening 83a is blocked by the light transmitting member 8. In this way, even when the detection member 78 is arranged outside of the receiving area 80A and the light detection opening 83a is formed in the first portion 83, it is possible to suppress a dustproof property from being reduced.

Furthermore, in the present embodiment, as described above, the housing sidewall part 82 integrally has the second portion 84 on which the detection member 78 is mounted. The second portion 84 is upright in a wall shape at an outer side of the first portion 83 in the direction A so as to face the first portion 83. Furthermore, one area of the outer side of the first portion 83 serves as the space 82S surrounded by the first portion 83 and the second portion 84. According to such a configuration, the one area (the space 82S) of the outer side of the first portion 83 is an area where the amount of dust is small. In this way, dust reaching the light detection opening 83a formed in the first portion 83 is reduced, so that it is possible to suppress dust from entering into the receiving area 80A via the light detection opening 83*a*.

Furthermore, in the present embodiment, as described above, the opening shape of the light detection opening 83*a* is a notch shape cut from an upper side of the first portion 83, and the light transmitting member 8 is fitted into the light detection opening 83*a* from an upper side of the first portion 83. Furthermore, the elastically deformable elastic member 9 is interposed between the light transmitting member 8 and the cover 90. According to such a configuration, it is possible to fill a gap between the light transmitting member 8 and the cover 90 by the elastic member 9. In this way, it is possible to reliably suppress dust from entering into the receiving area 80A via the light detection opening 83*a*.

Furthermore, in the present embodiment, as described above, the cover 90 has the top surface part 91 for closing the opening of the receiving area 80A and the cover sidewall part 92 upright in the direction A from the top surface part 91 so as to be arranged outside of the housing sidewall part 82. Moreover, at an inner side portion of the top surface part 91 from the cover sidewall part 92, the ribs 93 are formed to face the cover sidewall part 92 while being spaced apart from the cover sidewall part 92. Furthermore, the housing sidewall part 82 is interposed by the cover sidewall part 92 and the rib 93. According to such a configuration, even though there is a gap between an upper end of the housing sidewall part 82 and the top surface part 91, it is possible to suppress dust from entering into the receiving area 80A from the gap.

Herein, the light transmitting member 8 fitted into the light detection opening 83*a* defines the receiving area 80A together with the housing sidewall part 82. Furthermore, in the housing sidewall part 82, at the formation position of the light detection opening 83*a*, the light transmitting member 8 fitted into the light detection opening 83*a* is interposed by the cover sidewall part 92 and the rib 93. Consequently, the housing sidewall part 82 (also including the light transmitting member 8) defining the receiving area 80A enters a state interposed by the cover sidewall part 92 and the rib 93 across the entire circumference of the receiving area 80A. That is, a structure for suppressing dust from entering into the receiving area 80A is provided across the entire circumference of the receiving area 80A.

Therefore, for example, a partition plate (a wall for blocking the flow of dust) and the like are provided in the receiving area 80A, so that it is not necessary to take measures for suppressing the attachment of dust to the scanning optical system 72. In this way, heat (for example, heat generated in the polygon motor 75*a*) in the receiving area 80A is widely scattered, so that it is possible to suppress a local temperature increase.

Furthermore, in the present embodiment, as described above, the light transmitting member 8 is a lens for converging a light beam to the light receiving element 78*a* of the detection member 78. According to such a configuration, even though a distance between the light detection opening 83*a* and the detection member 78 is not increased, it is possible to match a focus of a light beam emitted from the light detection opening 83*a* with the light receiving element 78*a*. In this way, miniaturization of the exposure device 53 (the casing 50 including the housing 80) is possible.

It should be noted that the embodiment disclosed herein is illustrative in all respects and are not restrictive. The scope of the present disclosure is defined by the scope of the appended claims rather than the description of the aforementioned embodiment, and is intended to include all modifications within the meaning and scope equivalent to the scope of the appended claims.

The invention claimed is:

1. An optical scanning device comprising:
a scanning optical system that deflects and scans a surface to be scanned by a light beam emitted from a light source;
a housing having a bottom part and a housing sidewall part upright from the bottom part in a vertical direction and receiving the scanning optical system in a receiving area surrounded by the bottom part and the housing sidewall part;
a cover mounted on the housing from an upper side of the housing to close an opening of the receiving area; and
a detection member arranged outside of the receiving area to receive and detect the light beam and outputting a detection signal for measuring a start timing of optical scanning to the surface to be scanned,
wherein a first portion, which is a portion of the housing sidewall part, is formed with a light detection opening through which the light beam is emitted from an inside to an outside of the receiving area and is received in the detection member,
the light detection opening is closed by a light transmitting member through which the light beam passes,
the housing sidewall part integrally has a second portion on which the detection member is mounted,
the second portion is upright in a wall shape at an outer side of the first portion in the vertical direction so as to face the first portion, and
a space is provided between the first portion and the second portion, the space being separated from the receiving area.

2. The optical scanning device according to claim 1, wherein the light transmitting member is a lens for converging the light beam to the detection member.

3. An image forming apparatus including the optical scanning device according to claim 1.

4. An optical scanning device comprising:
a scanning optical system that deflects and scans a surface to be scanned by a light beam emitted from a light source;
a housing having a bottom part and a housing sidewall part upright from the bottom part in a vertical direction and receiving the scanning optical system in a receiving area surrounded by the bottom part and the housing sidewall part;
a cover mounted on the housing from an upper side of the housing to close an opening of the receiving area; and
a detection member arranged outside of the receiving area to receive and detect the light beam and outputting a detection signal for measuring a start timing of optical scanning to the surface to be scanned,
wherein a first portion, which is a portion of the housing sidewall part, is formed with a light detection opening through which the light beam is emitted from an inside to an outside of the receiving area and is received in the detection member,
the light detection opening is closed by a light transmitting member through which the light beam passes,
an opening shape of the light detection opening is a notch shape cut from an upper side of the first portion,
the light transmitting member is fitted into the light detection opening from an upper side of the first portion, and
an elastically deformable elastic member is interposed between the light transmitting member and the cover.

5. The optical scanning device according to claim 4, wherein the cover has a top surface part for closing an opening of the receiving area and a cover sidewall part upright in the vertical direction from the top surface part so as to be arranged outside of the housing sidewall part,
- at an inner side of the top surface part from the cover sidewall part, a rib is formed to face the cover sidewall part while being spaced apart from the cover sidewall part,
- the housing sidewall part is interposed by the cover sidewall part and the rib, and
- in the housing sidewall part, at a formation position of the light detection opening, the light transmitting member fitted into the light detection opening is interposed by the cover sidewall part and the rib.

6. The optical scanning device according to claim 4, wherein the light transmitting member is a lens for converging the light beam to the detection member.

7. An image forming apparatus including the optical scanning device according to claim 4.

* * * * *